UNITED STATES PATENT OFFICE.

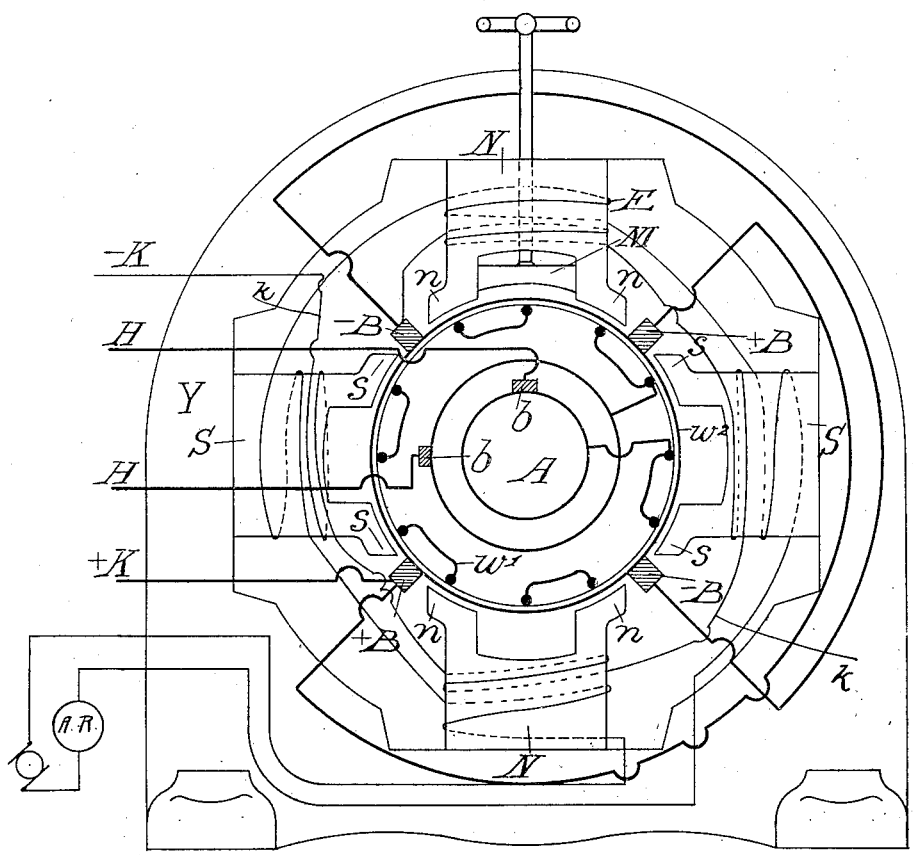

NICOLÖ PENSABENE, OF BIRMINGHAM, ENGLAND.

DYNAMO-ELECTRIC MACHINE.

1,067,191. Specification of Letters Patent. Patented July 8, 1913.

Application filed April 14, 1913. Serial No. 760,997.

*To all whom it may concern:*

Be it known that I, NICOLÖ PENSABENE, a subject of the King of Italy, and residing at Birmingham, in the county of Warwick, England, electrical engineer, have invented certain new and useful Improvements in and Relating to Dynamo-Electric Machines, of which the following is a specification.

My invention relates to a rotary converter for transforming direct current to alternating current of any frequency or vice versa, or alternating current to alternating current of different voltage or periodicity, or direct current of constant voltage to direct current of variable voltage or vice versa.

For the purpose of this invention, the machine employed has a field system constituted by groups of poles of the same polarity excited individually or collectively so as to induce electro-motive forces in at least two separate windings wound for different numbers of poles; and the present invention consists in a method and means by which the voltage ratio between the primary and secondary circuits or in two or more circuits in the case of a multi-current generator mechanically driven can be varied.

The drawing is a diagram representing one embodiment of this invention.

In the form adopted as an illustration of the invention, the machine has an armature A with a 4-pole direct current winding $w_2$ with commutator, and a 12-pole alternating current winding $w_1$ with slip rings. The main poles are plainly shown in the drawing and marked N. N. north poles, and S. S. south poles, and each consists of two small poles or projections $n$. $n$. and $s$. $s$. These poles are fixed to the yoke Y and are provided with the exciting windings E fed by the direct current supply. The width of the small projections is slightly less than $\frac{1}{12}$ of the circumference, to allow for the commutating zone. The brushes belonging to the two windings are marked respectively $+B$ $-B$ connecting the commutator to the leads $+K$, $-K$, and $b$ $b$ connecting the slip rings to the leads H. H.

Assuming that when this machine is fed through the leads $+K$, $-K$ by a direct current supply it revolves at say 3,000 revolutions per minute, then the winding $w_1$ will be induced with voltage of a periodicity of 300 complete cycles per second which correspond to the periodicity given at such a speed by a 12-pole generator. If the machine were used as an ordinary converter, by having slip rings connected to suitable tappings in the winding $w_2$, the periodicity of the voltage between these slip rings would be only 100 cycles. Also this voltage would bear a fixed ratio to the supply voltage according to the number of phases, and this ratio would not alter by altering the excitation. In the illustrated arrangement, on the contrary, the voltage of the winding $w_1$ can be chosen at will and can be varied by varying the excitation. In fact the leakage flux between two projections on the same main pole affects $\frac{1}{3}$ of the winding by inducing a back electro-motive force proportionate to its strength. The resultant electro-motive force induced in this winding is therefore the difference between the electro-motive force induced in $\frac{2}{3}$ of the conductors by the eight projections $n$ and $s$ minus the back electro-motive force induced by the other $\frac{1}{3}$ by this leakage flux between two projections of each main pole. Assuming that the path of the flux in these projections is saturated while the leakage path is not, then by increasing the excitation the leakage flux will increase in more rapid proportion than the useful flux. Therefore as the speed of the armature would go down in consequence of the total flux cutting the direct current winding increasing, the net result would be a reduction of the alternating current voltage. This variation in voltage involves, in this case, variation in speed and frequency.

In some cases it is desirable that the voltage should be altered without altering the frequency, and for this purpose there is shown in the drawing a simple mechanical device fitted to the top pole, by which the leakage flux can be varied by moving a block of iron M which is slidably fitted between the two projections $n$ $n$. Each pole may be similarly fitted with a block M. It is obvious that if it is desired to keep the frequency constant the speed must be kept constant, and therefore the main flux must be kept constant. For this purpose, if the leakage flux is increased, the useful flux in the main poles must be reduced by suitable reduction in the excitation. Therefore it will be seen that the voltage in the alternating current winding $w_1$ is reduced from two causes.

The arrangement described with reference to the drawing is one of many which can be easily devised to obtain the same result.

In a machine having a field system constituted as described and inducing electromotive forces in a plurality of separate windings wound for different numbers of poles, it may be stated that, considering the case of only two windings, it is desirable, for reasons of symmetry, that the numbers of poles, say $p_1$ $p_2$, for which these windings are wound should be such that $\dfrac{p_1}{p_2}$ be an odd number.

Assuming the field system constituted by $p_1$ poles or $p_2$ groups of $\dfrac{p_1}{p_2}$ poles:—If in each of these groups I suppress one or more of the poles in such a way as to leave $p_2$ groups of poles of alternate polarity, the windings $w_1$ (having the larger number of poles) and $w_2$ (having the smaller number of poles) will behave in such a field system just the same as ordinary $p_1$ and $p_2$ poles windings. The number of poles suppressed per group can be either $$\dfrac{\dfrac{p_1}{p_2}-1}{2}$$

or $$\dfrac{\dfrac{p_1}{p_2}+1}{2}$$

The small poles constituting each group or main pole can each be excited with a spool or can be all excited with a common field winding. It will be seen that the voltage generated in winding $w_1$ is reduced in proportion to the number of poles suppressed and that this voltage is induced in a similar way but only partially as it is in an inductor or pulsatory flux alternator. In fact there will be no reversal of flux in a coil while this passes under one main pole, but this reversal takes place of course when it passes from one main pole to another.

The advantages of this type of machine over the usual rotary converter with one winding only are:—independence of voltages of the windings; the possibility of using it as a frequency converter; the electrical independence of the circuits, which last is of special advantage because there would be no interference between the higher frequency circuit and the supply circuit.

Experimenting with this type of machine, having one large field spool per main pole, I have now discovered that if the field excitation is increased the ratio between the voltages of the windings can be varied. The reason for this is that when increasing the field excitation the leakage flux passing in the space between two consecutive small poles or projections of each main pole increases, and in consequence, similarly to any inductor type machine, it produces a back electro-motive force in the winding $w_1$ which has a larger number of poles. Now, if by saturation of the main path it is arranged that the increased excitation does not increase the main useful flux cutting this winding, the net result will be a reduction in this winding terminal voltage, but as the leakage flux for winding $w_1$ is useful flux for winding $w_2$ the terminal voltage in this winding will be increased.

It is clear that by suitable design the winding $w_1$ can be made to generate a resultant electro-motive force almost constant for large variations of excitation. Therefore, in the case where the machine is used as a synchronous motor-generator, the voltage of winding $w_2$ can be varied by altering the field excitation without affecting the power factor of the motor side.

If the machine is used for converting alternating current to alternating current of higher frequencies, the effect of strengthening the exciting field will be to increase the leading current on the motor side and to reduce the voltage on the generator side. If used as direct current to alternating current converter, any increase in the excitation will reduce the speed of the machine and the frequency and also the alternating current voltage, for the reason explained above. This of course is true when the direct current winding is the one having the smaller number of poles. It is obvious that the variation in the excitation can be produced automatically by compounding the field system with the direct current either from the motor side or from the generator side as the case may be, as indicated by the wire $k$ connected with the lead —K and brush —B and having windings on the several cores of the field magnets. It is possible in this way to keep the secondary voltage constant, or to make it vary within certain limits.

As already explained, the ratio between the electro-motive force induced in winding $w_1$ to the electro-motive force induced in winding $w_2$ decreases by increase in excitation, and increases by reduction of excitation. From this general rule it is possible to decide the direction of the series turns to obtain the desired effect. As an example, take the case of direct current to direct current transformation, and assume that the generator voltage must be kept constant at any load. If the winding $w_1$ is the motor side, the field system must be weakened when the load comes on in order to prevent a voltage drop in the generator side; therefore the series turns must oppose the shunt excitation. By doing this, as soon as the load comes on the speed increases in larger ratio than the flux diminishes in winding $w_1$; therefore the net result will be an increased electro-motive force in this winding, which will compensate for the ohmic drop. It is of course obvious that, if the motor side is the winding $w_1$, the compound must assist the shunt. In this case, the reduction in speed with increased excitation is less than the increase in the flux cutting the winding $w_2$, and the net result is an increase of electro-motive force in this winding, which compensates for the ohmic drop.

In order to avoid variations in the power factor or speed and frequency when large variation in the voltage is required, a simple device as hereinbefore described can be used by which the flux passing between two consecutive projections can be altered at will.

If a machine utilized according to this invention is mechanically driven, the voltage ratio between the different windings can be varied, by utilizing the leakage flux as set forth and, if desired, by regulating the leakage flux, in the manner indicated.

Having fully described my invention, what I claim and desire to secure by Letters Patent, is:—

1. In a dynamo-electric machine, a field magnet system comprising groups of poles of the same polarity, a plurality of separate windings wound for different numbers of poles in which windings electro-motive forces are induced by the field system, and means for varying the excitation of said field magnet system and the leakage flux between the poles of each group, thereby inducing a back electro-motive force in a winding having a larger number of poles and inducing an additional electro-motive force in a winding having a smaller number of poles, for the purpose of varying the voltage ratio between the circuits connected with said windings.

2. In a dynamo-electric machine, a field magnet system constituted by groups of poles of the same polarity, a plurality of separate windings wound for different numbers of poles in inductive relation to said field magnet system, and a movable iron core between two adjacent projections of the same group of poles, whereby the leakage flux may be regulated, substantially as set forth.

3. In a dynamo electric machine the combination with a field magnet system comprising groups of poles of the same polarity, and a plurality of windings in inductive relation with said field magnet system and wound for different numbers of poles, of means for exciting said field magnet system and thereby producing between the poles of a group thereof incidentally to the production of the main flux a leakage flux inductively effective on said winding having the minor number of poles.

4. In a dynamo electric machine the combination of a field magnet system comprising groups of poles of the same polarity, a plurality of windings in inductive relation with said field magnet system and wound for different numbers of poles, means for exciting said field magnet system and thereby producing between said group-forming poles a leakage flux, and means for regulating said leakage flux.

5. In a dynamo electric machine the combination of a field magnet system comprising groups of poles of the same polarity, a plurality of windings in inductive relation with said field magnet system and wound for different numbers of poles, means for exciting said field magnet system and thereby producing between said group-forming poles a leakage flux, and a movable iron core between two adjacent projections of the same group of poles whereby said leakage flux may be regulated.

In witness whereof I have hereunto signed my name this 4th day of April 1913, in the presence of two subscribing witnesses.

NICOLÒ PENSABENE.

Witnesses:
S. HAYES,
G. C. GOOLD.